(12) United States Patent
Imine

(10) Patent No.: US 11,500,450 B2
(45) Date of Patent: Nov. 15, 2022

(54) INFORMATION PROCESSING APPARATUS INCLUDING CONTROLLER CAPABLE OF COMMUNICATING WITH CONNECTED EXTERNAL APPARATUS AND SHIFTING TO POWER-SAVING STATE, AND CONTROL METHOD THEREFOR

(71) Applicant: CANON KABUSHIKI KAISHA, Tokyo (JP)

(72) Inventor: Ryotaro Imine, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/128,320

(22) Filed: Sep. 11, 2018

(65) Prior Publication Data

US 2019/0094950 A1    Mar. 28, 2019

(30) Foreign Application Priority Data

Sep. 26, 2017  (JP) .............................. JP2017-185428

(51) Int. Cl.
*G06F 1/32* (2019.01)
*G06F 1/26* (2006.01)
*G06F 13/42* (2006.01)
*G06F 1/3296* (2019.01)

(52) U.S. Cl.
CPC ............ *G06F 1/3296* (2013.01); *G06F 1/266* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| 2009/0070604 | A1 | 3/2009 | Kumakura |
| 2011/0072284 | A1* | 3/2011 | Lyra ...................... G06F 13/102 713/320 |
| 2012/0084592 | A1* | 4/2012 | Lin ........................ G06F 1/266 713/324 |

(Continued)

FOREIGN PATENT DOCUMENTS

| CN | 102081581 A | 6/2011 |
| CN | 102354305 A | 2/2012 |

(Continued)

*Primary Examiner* — Fahmida Rahman
(74) *Attorney, Agent, or Firm* — Canon U.S.A., Inc. IP Division

(57) ABSTRACT

According to one embodiment, an information processing apparatus includes a universal serial bus (USB) controller capable of shifting to a low-power state and configured to transmit data with a predetermined pattern to a personal computer (PC) when the USB controller is recovered from the low-power state. The information processing apparatus includes a hardware logic configured to cause the USB controller to shift to the low-power state, a reading unit configured to read an image formed on a document according to a reading instruction, and a physical layer (PHY) configured to transmit, to the PC, image data on the document with the image read by the reading unit. The information processing apparatus prohibits the USB controller from shifting to the low-power state during a period in which the PHY transmits the image data to the PC.

8 Claims, 10 Drawing Sheets

(56) References Cited

U.S. PATENT DOCUMENTS

| | | | |
|---|---|---|---|
| 2014/0043634 A1* | 2/2014 | Haga | G06F 9/45545 358/1.13 |
| 2015/0355696 A1 | 12/2015 | Pamley | |
| 2016/0055009 A1* | 2/2016 | Sakamoto | G06F 9/4411 710/14 |
| 2016/0134772 A1* | 5/2016 | Kawaguchi | H04N 1/00209 358/1.13 |
| 2016/0224493 A1* | 8/2016 | Wang | G06F 13/385 |

FOREIGN PATENT DOCUMENTS

| | | |
|---|---|---|
| CN | 103874970 A | 6/2014 |
| CN | 104699642 A | 6/2015 |
| CN | 105208237 A | 12/2015 |
| JP | 2011101321 A | 5/2011 |
| JP | 2012132961 A | 7/2012 |
| JP | 2012218248 A | 11/2012 |
| JP | 2013090006 A | 5/2013 |

\* cited by examiner

FIG. 7

| Symbol Number | Encoded Values | Description |
|---|---|---|
| .... | .... | .... |
| 6-15 | D10.2 | TS1 Identifier |

FIG. 8

| Data Byte Name | Data Byte Value (hex) | Bits HGF EDCBA (binary) | Current RD-abcdei fghj(binary) | Current RD+abcdei fghj(binary) |
|---|---|---|---|---|
| D10.2 | A4 | 010 01010 | 010101 0101 | 010101 0101 |

INFORMATION PROCESSING APPARATUS INCLUDING CONTROLLER CAPABLE OF COMMUNICATING WITH CONNECTED EXTERNAL APPARATUS AND SHIFTING TO POWER-SAVING STATE, AND CONTROL METHOD THEREFOR

BACKGROUND

Field

The present disclosure relates to an information processing apparatus including a controller capable of communicating with a connected external apparatus and shifting to a power-saving state, and a control method therefor.

Description of the Related Art

Recent information processing apparatuses, such as personal computers and copying machines, include an interface to communicate with an external apparatus. Serial interfaces, such as a universal serial bus (USB) and a Peripheral Component Interconnect (PCI) express, are actively used as interfaces to communicate with an external apparatus. Some printers and scanners are provided with a USB controller for receiving print data transmitted from an external apparatus and transmitting scan data obtained by scanning to the external apparatus.

Standards for the interfaces as described above have been revised according to the social needs. For example, the data transfer rate (up to 5 Gbps) of USB3.0, which provides faster data transfer than USB2.0, is about ten times as fast as the data transfer rate (up to 480 Mbps) of USB2.0. In USB3.0, low-power states called U1, U2, and U3 are defined as power management functions to obtain respective different power-saving effects.

As discussed in Japanese Patent Application Laid-Open No. 2011-101321, in the case of shifting from the state U1, U2, or U3 to a state U0 which enables communication with an external apparatus, in USB3.0, a training sequence is executed. In the training sequence, for example, periodic pattern data called a TS1 ordered set or a TS2 ordered set is mutually transmitted and received to thereby perform clock data recovery (CDR). The training sequence is executed every time the state is recovered from the U1, U2, or U3 to the state U0. Further, shifting from the state U0 to the state U1, U2, or U3 is carried out on condition that a USB bus is in an idling state. Accordingly, even during printing or scanning, shifting from the state U0 to the state U1, U2, or U3 is executed if the USB bus is brought into the idling state. Therefore, there is a concern about the risk of Electro Magnetic Interference (EMI) due to the frequent transmission and reception of periodic pattern data as described above during printing or scanning.

SUMMARY

Various embodiments of the present disclosure are directed to avoiding, by software control, the risk of Electro Magnetic Interference (EMI) resulting from periodic data with a predetermined pattern to be transmitted and received when a controller that transmits and receives data to and from an external apparatus is recovered from a low-power state.

According to one embodiment, an information processing apparatus includes a reception unit configured to receive a transmission instruction for transmitting data, a universal serial bus (USB) controller configured to transmit data to an external apparatus through a USB bus according to the transmission instruction, be capable of shifting to a low-power state during transmission of the data, and transmit and receive data with a predetermined pattern to and from the external apparatus through the USB bus when the USB controller is recovered from the low-power state, and a prohibition unit configured to prohibit the USB controller from shifting to the low-power state during transmission of the data from the information processing apparatus to the external apparatus through the USB bus.

Further features will become apparent from the following description of exemplary embodiments with reference to the attached drawings.

BRIEF DESCRIPTION OF THE DRAWINGS

FIG. 7 illustrates a TS1 ordered set defined in the USB standard according to one embodiment, FIG. 8 is a part of code in a 8B10B encoding scheme according to one embodiment.

DESCRIPTION OF THE EMBODIMENTS

<Image Forming Apparatus>

Figure 1:
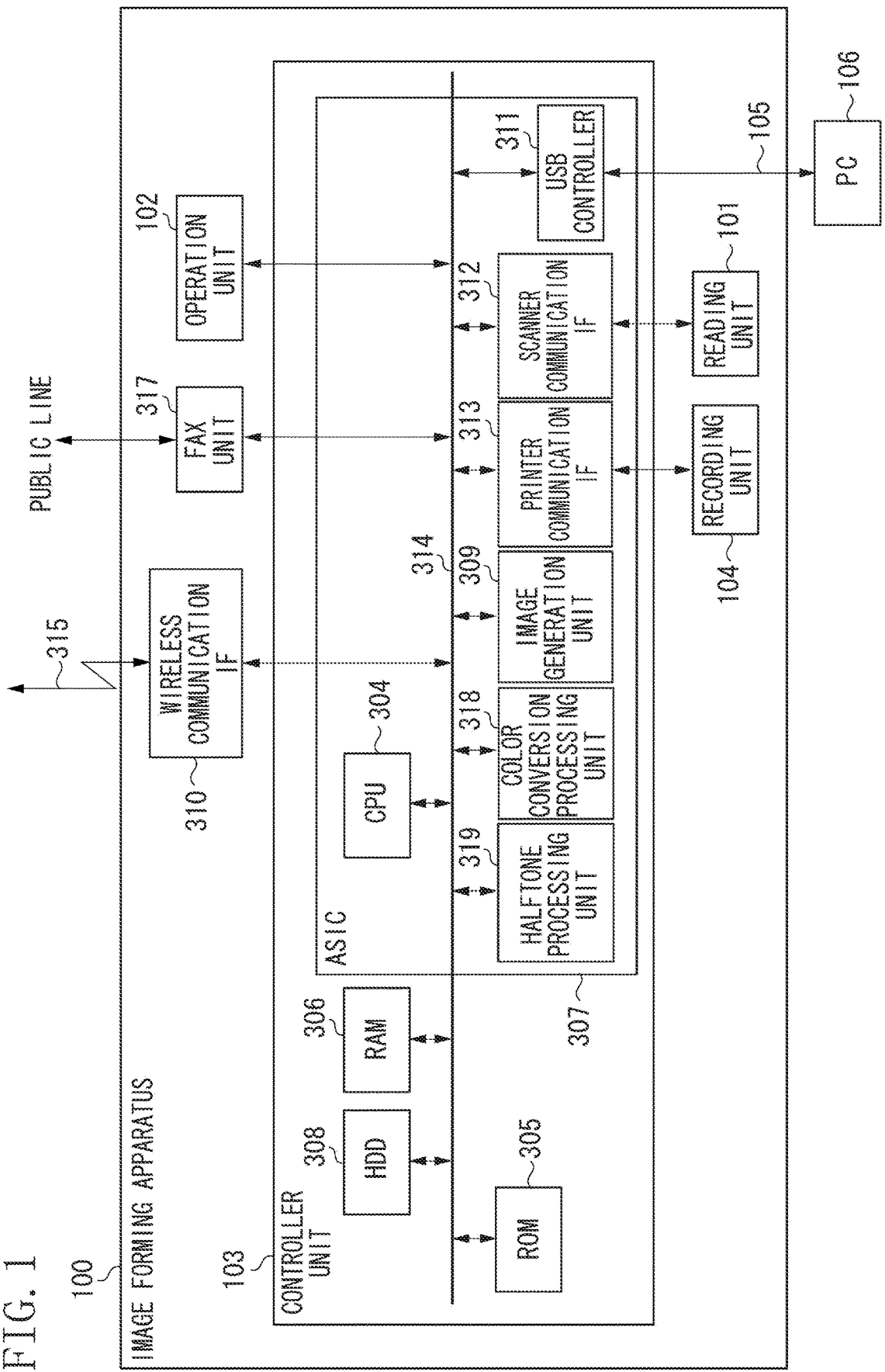
FIG. 1 is a block diagram illustrating a system configuration including an image forming apparatus according to a first exemplary embodiment.

FIG. 1 illustrates a system that connects an image forming apparatus according to a first exemplary embodiment and a personal computer (PC) to each other with a universal serial bus (USB) cable.

An image forming apparatus 100 according to the first exemplary embodiment includes a reading unit 101 that reads an image formed on a document, an operation unit 102 that receives a user's operation, a recording unit 104 that prints an image on a recording medium such as paper, a wireless communication interface (hereinafter referred to as a wireless communication IF) 310, and a facsimile (FAX) unit 317. The image forming apparatus 100 also includes a controller unit 103 that controls the entire image forming apparatus 100 including the reading unit 101 and the recording unit 104. The image forming apparatus 100 is an example of an information processing apparatus according to an exemplary embodiment of the present disclosure.

The operation unit 102 receives an input from a user of the image forming apparatus 100 and displays a predetermined screen on a display unit (not illustrated). The FAX unit 317 is communicably connected to a public line and performs, for example, transmission and reception of facsimile data. The wireless communication IF 310 performs data communication with a peripheral device by wireless communication using WiFi, Bluetooth®, or the like.

The controller unit 103 includes a USB controller 311. The USB controller 311 and a personal computer (PC) 106 are connected through a USB cable 105 so that the USB controller 311 and the PC 106 can communicate with each other. The USB controller 311 transmits data on the image formed on the document, which is read by the reading unit 101, to the PC 106, and receives print data transmitted from the PC 106.

<Controller Unit>

The controller unit 103 includes a central processing unit (CPU) 304, a read only memory (ROM) 305, a random access memory (RAM) 306, and a hard disk drive (HDD) 308. The CPU 304 is implemented in an application specific integrated circuit (ASIC) 307. The CPU 304 reads out a main program from the ROM 305 according to an initial program stored in the ROM 305, and stores the main program in the RAM 306. The RAM 306 is used to store a program or is used as a main memory for work. The HDD 308 is used to record a program, image data, and the like.

In the ASIC 307, the CPU 304, the USB controller 311, a scanner communication interface (hereinafter referred to as a scanner IF) 312, and a printer communication interface (hereinafter referred to as a printer IF) 313 are implemented. In the ASIC 307, an image generation unit 309, a color conversion processing unit 318, and a halftone processing unit 319 are implemented.

The image generation unit 309 generates raster image data from the print data received from the PC 106, and outputs RGB data for each pixel. Further, the image generation unit 309 processes the data on the image read by the reading unit 101. The reading unit 101 includes at least one of a charge-coupled device (CCD) and a contact image sensor (CIS). The image generation unit 309 may perform predetermined image processing on the data on the read image.

The color conversion processing unit 318 converts the RGB data generated by the image generation unit 309 into CMYK data representing toner colors of cyan, magenta, yellow, and black. CMYK data indicates the amount of CMYK toner and is represented by, for example, 8-bit values 0 to 255 for each pixel. As specific values, for example, the value "0" in each color indicates that toner of the color is unused, a larger value indicates a higher density, and the value "255" indicates a maximum density of each color.

The halftone processing unit 319 performs halftone processing on data on each color output from the color conversion processing unit 318. The halftone processing unit 319 may perform screen processing or error diffusion processing. The screen processing includes N-value processing using a plurality of predetermined dither matrices and input image data. The error diffusion processing is processing in which N-value processing is performed on a pixel of interest in the input image data by comparing the pixel of interest with a predetermined threshold and the difference between the pixel of interest and the threshold obtained as a result of N-value processing is diffused to peripheral pixels to be subsequently subjected to N-value processing.

The printer IF 313 is an interface for establishing a communication between the controller unit 103 and the recording unit 104. Information to be communicated in this case includes image data to be printed, a control signal to be transmitted from the controller unit 103, and information about a document type setting, a paper discharge setting, and the like. Transmission and reception of control signals, such as a print start request and a print ready notification, are carried out to perform a print operation sequence in synchronization between the controller unit 103 and the recording unit 104.

The scanner IF 312 is an interface for establishing a communication between the controller unit 103 and the reading unit 101. Information to be communicated in this case includes image data on a document read by the reading unit 101, and a control signal to be transmitted from the controller unit 103.

The USB controller 311 is a module that operates based on specifications defined in the USB standard, and is connected to the external PC 106 with the USB cable 105. The USB controller 311 can transmit the image data output from the reading unit 101 to the PC 106 through the USB cable 105. Further, the USB controller 311 can transmit the print data output from the PC 106 to the recording unit 104 through the USB cable 105. Next, the USB controller 311 will be described in detail.

<USB Controller>

Figure 2:
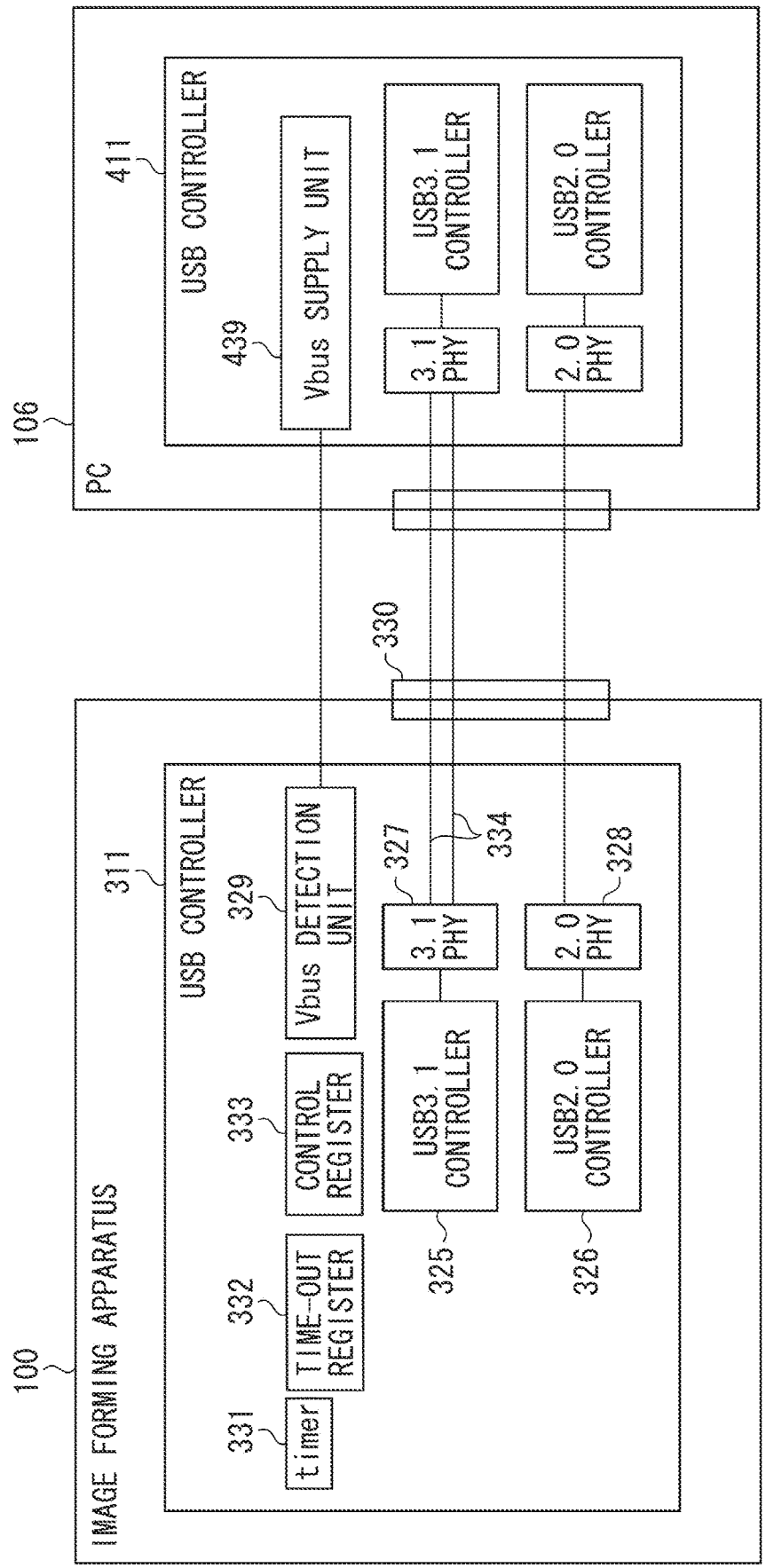
FIG. 2 is a block diagram illustrating details of a universal serial bus (USB) controller.

FIG. 2 is a block diagram illustrating details of the USB controller 311.

The USB controller 311 includes a USB3.1 controller (first control unit) 325 for performing communication control at SuperSpeed (high speed), and a USB3.1 physical layer (PHY) 327. The USB controller 311 also includes a USB2.0 controller (second control unit) 326 that performs communication control at HighSpeed/FullSpeed (low speed), a USB2.0 PHY 328, and a Vbus detection unit 329 that detects bus power.

The USB3.1 controller 325 is independent of the USB2.0 controller 326. One of the USB3.1 controller 325 and the USB2.0 controller 326 exclusively communicates with the connected PC 106. Specifically, when the Vbus detection unit 329 detects that bus power is supplied from a Vbus supply unit 439, the Vbus detection unit 329 detects whether a receiver (USB3.1 controller) capable of performing communication at. SuperSpeed is present in the PC 106. The detection of the receiver is carried out by the controller with a higher communication speed. Specifically, in the case of the configuration in FIG. 2, the USB3.1 controller 325 capable of performing communication at SuperSpeed detects the receiver. If the receiver capable of performing communication at SuperSpeed cannot be detected, the USB2.0 controller 326 detects the receiver.

Figure 3:
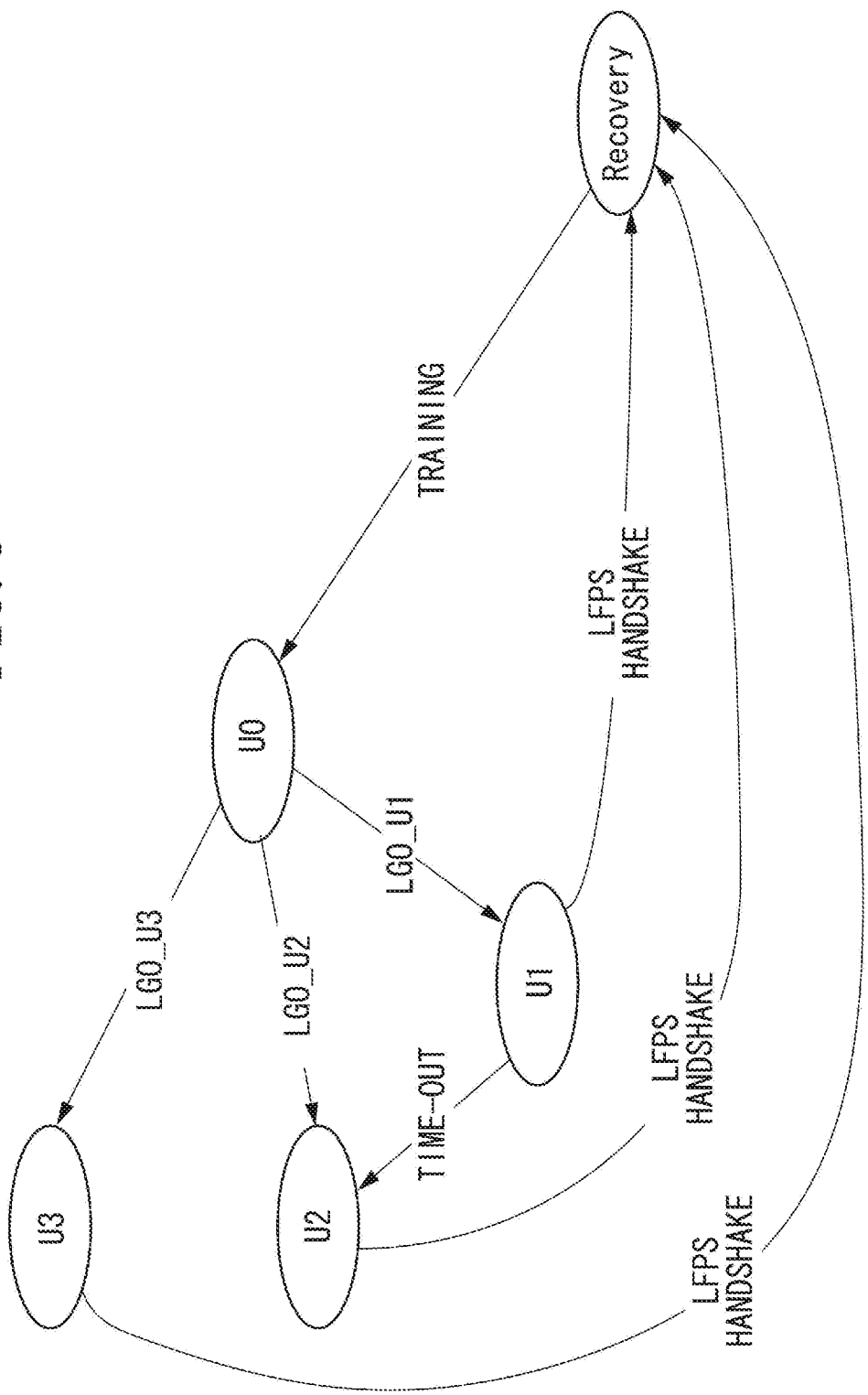
FIG. 3 illustrates a part of a Link Training Sequence State Machine (LTSSM) defined in the USB standard.

A communicable state described herein refers to a U0 state in a Link Training Sequence State Machine (LTSSM) in FIG. 3. The LTSSM is a state machine in which a state of a USB interface and a transition condition are implemented.

When the USB controller 311 performs a state transition according to the LTSSM, the USB controller 311 transmits a predetermined command to the PC 106, thereby allowing a USB controller 411 of the PC 106 to shift to the same power state as the USB controller 311.

The USB controller 311 includes a timer 331 and a time-out register 332. If a USB bus (communication path) 334 is in an idling state, the timer 331 counts the time. If the count value exceeds a time set in the time-out register 332, the timer 331 issues, to the PC 106, a transition request command for transition to a low-power state.

The USB3.1 controller 325 includes a control register 333 which is involved in the state transition of the LTSSM that is accessible from the CPU 304. If a predetermined value is input to the control register 333 (Application Specific Activity setting (hereinafter referred to as ASA setting)=0), the power state of the USB controller 311 is fixed to the U0 state. Specifically, during a period in which the ASA setting is "0", the USB3.1 controller 325 does not shift to U1, U2, or U3 even when the USB bus 334 is in the idling state.

<Link Training Sequence State Machine (LTSSM)>

FIG. 3 illustrates a part of the LTSSM defined in the USB standard.

The U0 state is a normal operation state in which transmission and reception of data to and from the PC 106 can be performed. The U1, U2, and U3 states are low-power states in which data transmission and reception cannot be performed. In the case of recovering from the low-power state, the USB controller 311 first performs handshake processing by a method called Low Frequency Periodic Signaling (LFPS). Further, the USB controller 311 passes through a recovery state and executes the training sequence, and then shifts to the U0 state.

The transition from the U0 state to the low-power state (U1, U2, or U3 state) is performed by transmitting and receiving a command to and from a connected counterpart apparatus. In FIG. 3, LGO_U1 represents a command indicating a request for transition to the U1 state. In FIG. 3, LGO_U2 represents a command indicating a request for transition to the U2 state, and LGO_U3 represents a command indicating a request for transition to the U3 state. These transition request commands are transmitted to the counterpart apparatus on condition that an elapsed time during which the USB bus 334 is in the idling state exceeds a set time. The set time is set in the time-out register 332 by the CPU 304.

<Sequence of Shifting to Low-Power State>

Figure 4A:
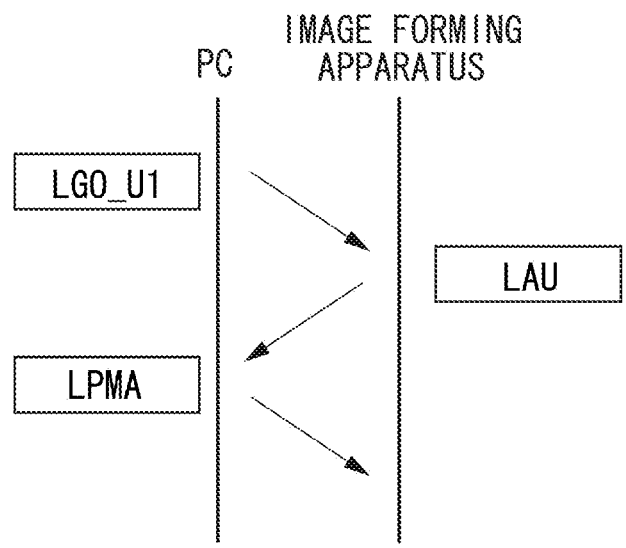
FIGS. 4A and 4B each illustrate a sequence of shifting to a low-power state according to one embodiment.
Figure 4B:
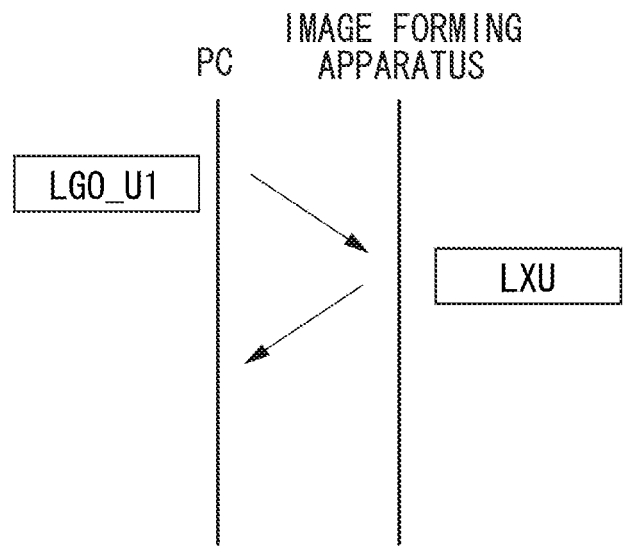

FIGS. 4A and 4B each illustrate a sequence of shifting to the low-power state. In FIGS. 4A and 4B, LGO_U1 represents a transition request command for transition to the U1 state, LAU represents a transition permission command to be issued in response to the transition request command, LPMA represents a reception command indicating that the transition permission command is received, and LXU represents a transition refusal command for refusing a transition request.

FIG. 4A illustrates a sequence to be performed in a case where the transition to the U1 state is permitted. If the USB controller 411 of the PC 106 determines that a condition for shifting to the U1 state is satisfied, the USB controller 411 transmits the transition request command LGO_U1 to the USB controller 311. The image forming apparatus 100 sends the transition permission command LAU as a response to the transition request command LGO_U1. Further, the USB controller 411 of the PC 106 transmits, to the USB controller 311, the reception command LPMA indicating that the transition permission command LAU is received. After the transmission and reception of these commands, both the USB controller 311 and the USB controller 411 shift to the U1 state.

FIG. 4B illustrates a sequence to be performed in a case where the transition to the U1 state is refused. If the USB controller 411 of the PC 106 determines that the condition for shifting to the U1 state is satisfied, the USB controller 411 transmits the transition request command LGO_U1 to the USB controller 311. The USB controller 311 sends the transition refusal command LXU in response to the transition request command LGO_U1. For example, if the ASA setting of the USB controller 311 is "0", the USB controller 311 transmits the transition refusal command LXU to refuse the shifting to the low-power state.

<Sequence of Shifting to Low-Power State>

Figure 5:
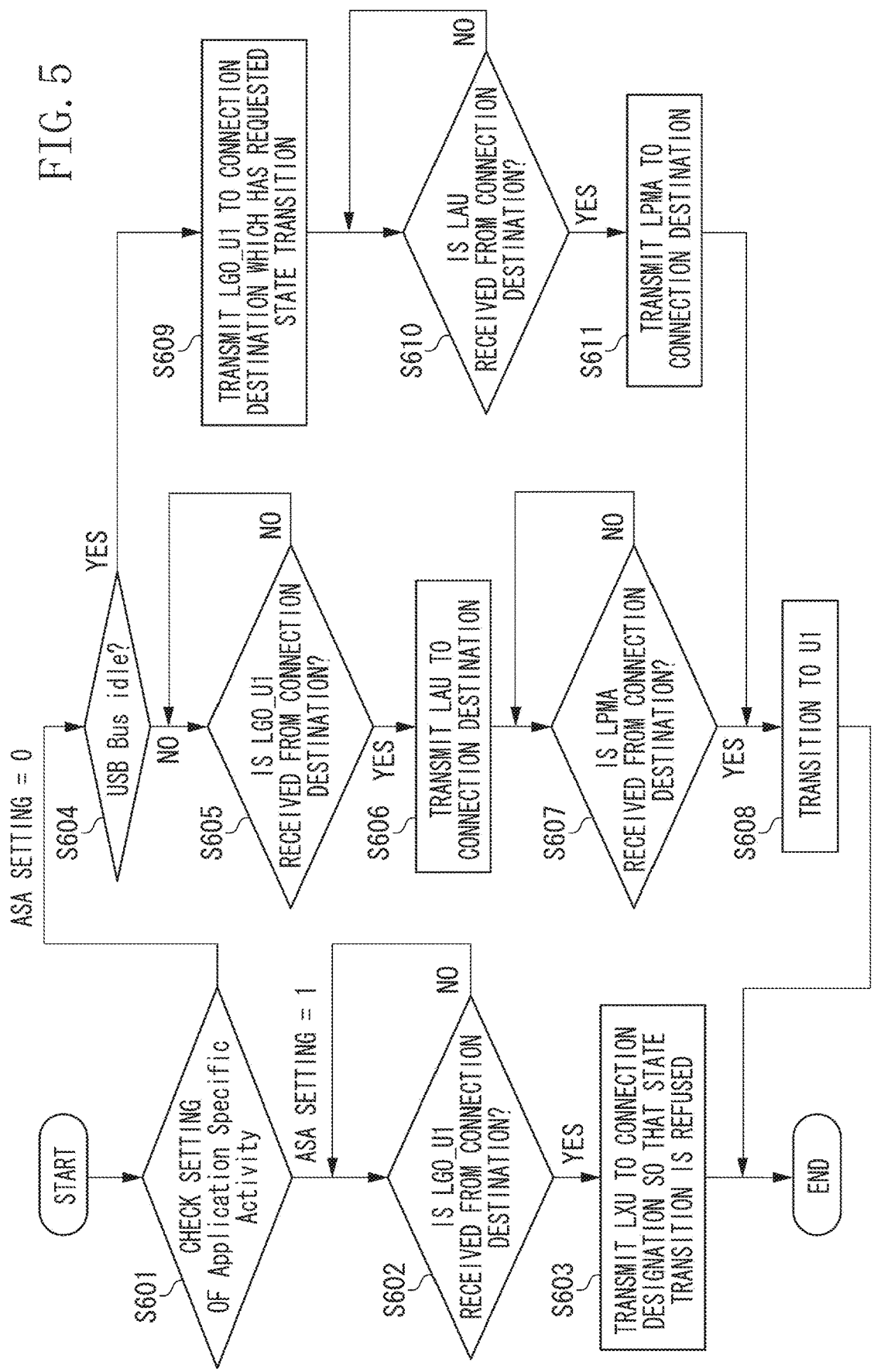
FIG. 5 is a flowchart illustrating an operation to be performed when the USB controller shifts to the low-power state according to one embodiment.

FIG. 5 is a flowchart illustrating an operation to be performed when the USB controller 311 shifts to the low-power state. The flowchart is executed by the USB3.1 controller (power control unit) 325 of the USB controller 311. In step S601, the USB controller 311 first checks the ASA setting. If the ASA setting is "1", the processing proceeds to step S602 and the USB3.1 controller 325 determines whether the transition request command LGO_U1 is received from the PC 106. If the transition request command LGO_U1 is received (YES in step S602), the processing proceeds to step S603 and the USB3.1 controller 325 transmits the transition refusal command LXU to the PC 106.

In step S601, if the ASA setting is "0", the processing proceeds to step S604 to determine whether the count value of the timer 331 has exceeded the time set in the time-out register 332. If the count value of the timer 331 has exceeded the time set in the time-out register 332 (YES in step S604), the processing proceeds to step S609 and the USB3.1 controller 325 transmits the transition request command LGO_U1. Next, in step S610, if the transition permission command LAU is received from the PC 106 (YES in step S610), the processing proceeds to step S611 to transmit the reception command LPMA to the PC 106. In step S608, the USB3.1 controller 325 shifts to the U1 state.

In step S604, if the count value of the timer 331 has not exceeded the time set in the time-out register 332 (NO in step S604), the processing proceeds to step S605 and the USB3.1 controller 325 determines whether the transition request command LGO_U1 is received from the PC 106. If the transition request command LGO_U1 is received (YES in step S605), the processing returns to step S606 and the USB3.1 controller 325 transmits the transition permission command LAU to the PC 106. Next, in step S607, if the USB3.1 controller 325 receives the reception command LPMA from the PC 106 (YES in step S607), the processing proceeds to step S608 and the USB controller 325 shifts to the U1 state.

While FIG. 5 illustrates an example of the operation flow to request the transition to the U1 state, the same is true of the transition to the U2 state and the transition to the U3 state.

<Sequence of Recovery From Low-Power State>

Figure 6:
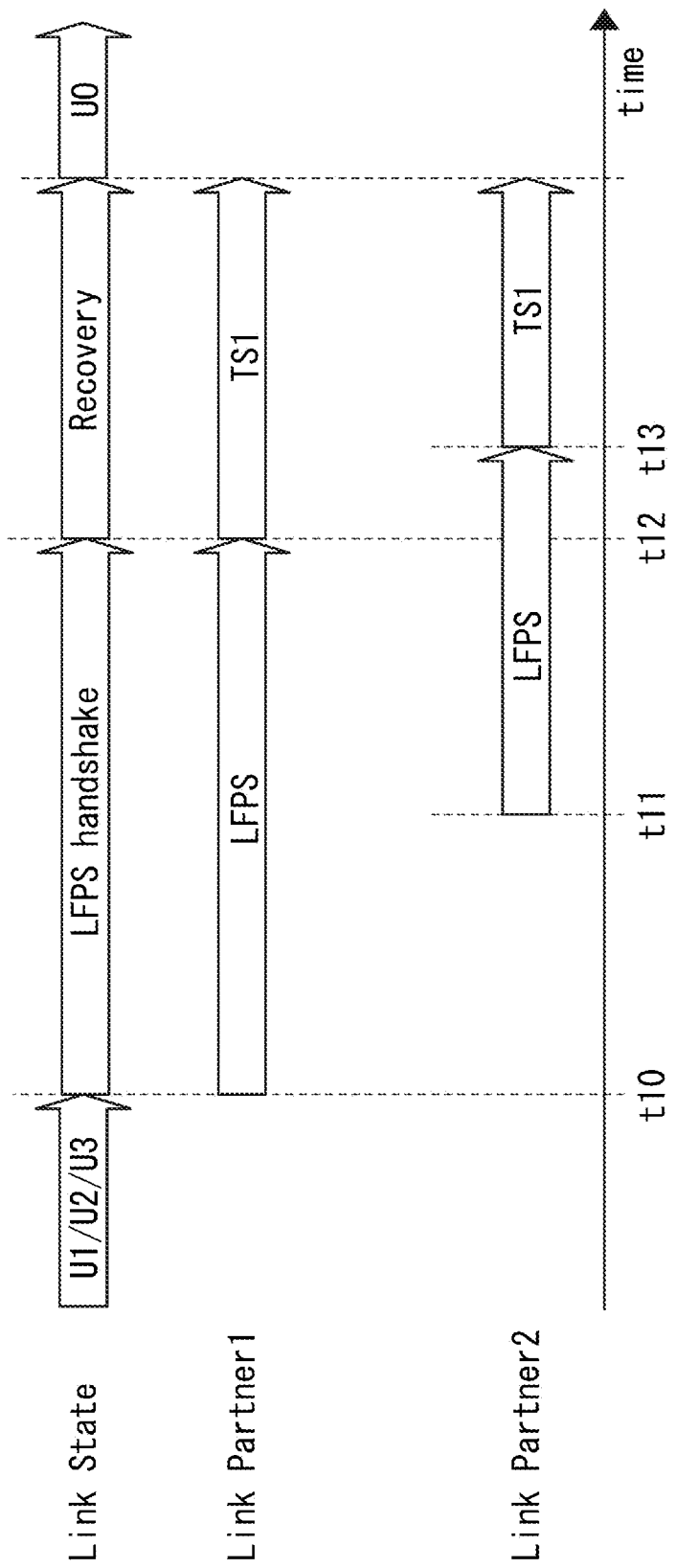
FIG. 6 illustrates a sequence of training to be executed when the USB controller is recovered from the low-power state according to one embodiment.

FIG. 6 illustrates a sequence of training to be executed when the USB controller 311 is recovered from the low-power state. "Link State" in FIG. 6 represents the state of the USB controller 311. "LinkPartner1" represents a signal to be transmitted from the image forming apparatus 100 to the PC 106. "LinkPartner2" represents a signal to be transmitted from the PC 106 to the image forming apparatus 100.

The state of the USB controller is first set to the low-power state (one of the U1, U2, and U3 states). At time "t10", a recovery event is generated. Examples of the recovery event include transmission of data from the image forming apparatus 100 to the PC 106. At time "t10", the USB3.1 controller 325 of the image forming apparatus 100 transmits a Low Frequency Periodic Signaling (LFPS) signal to the PC 106. The LFPS signal is a low-frequency burst signal that is defined in the USB standard and is used for initial communication before starting high-speed communication during recovery.

The PC 106 which has received the LFPS signal from the image forming apparatus 100 transmits the LFPS signal to the image forming apparatus 100 at time "t11", Next, at time "t12", the image forming apparatus 100 shifts to the recovery state after receiving the LFPS signal transmitted from the PC 106. During a period from time "t10" to time "t12", the USB controller 311 is in an LFPS handshake state and then shifts to the recovery state.

In the recovery state, the USB controller 311 transmits a signal called TS1 (hereinafter referred to as a TS1 signal) in FIG. 6 so that the USB controller 311 is recovered to the U0 state. Like the image forming apparatus 100, the PC 106 also transmits the TS1 signal at time "t13" after outputting the UPS signal for a certain period of time. The TS1 signal is defined in the USB standard. The TS1 signal is transmitted so that it can be confirmed that communication can be stably performed, specifically, it can be confirmed that clock data recovery can be normally performed.

<TS1 Ordered Set>

FIG. 7 illustrates a TS1 ordered set defined in the USB standard. The TS1 ordered set is carried out so as to check whether clock data recovery in the training sequence described above can be normally performed. In the TS1 ordered set, D10.2 code is defined as a TS1 identifier in Symbol Number "6-15" in the definition of data constituting the TS1 ordered set.

<D10.2 Code>

FIG. 8 illustrates a part of an 8B10B code table. 8B10B is an encoding scheme that is used for serial interfaces to convert 8-bit data into a 10-bit symbol to be transmitted. FIG. 8 illustrates an encoding bit string of D10.2 defined in the TS1 ordered set in FIG. 7. "Data Byte Name" D10.2 in FIG. 8 represents a code name, and "Data Byte Value" 4A represents a value (in hexadecimal notation) indicating D10.2. "Bits HGF EDCBA (binary)" represents data corresponding to encoding input bits in a binary expression. "Current RD-abcdeifghj" and "Current RD+abcdeifghj" represent bit strings for encoding output data patterns. Thus, it is obvious that a bit string is data represented by values "0" and "1". Transmission and reception of data with such a predetermined periodic pattern may cause an occurrence of Electro Magnetic Interference (EMI).

<Flowchart>

Figure 9:
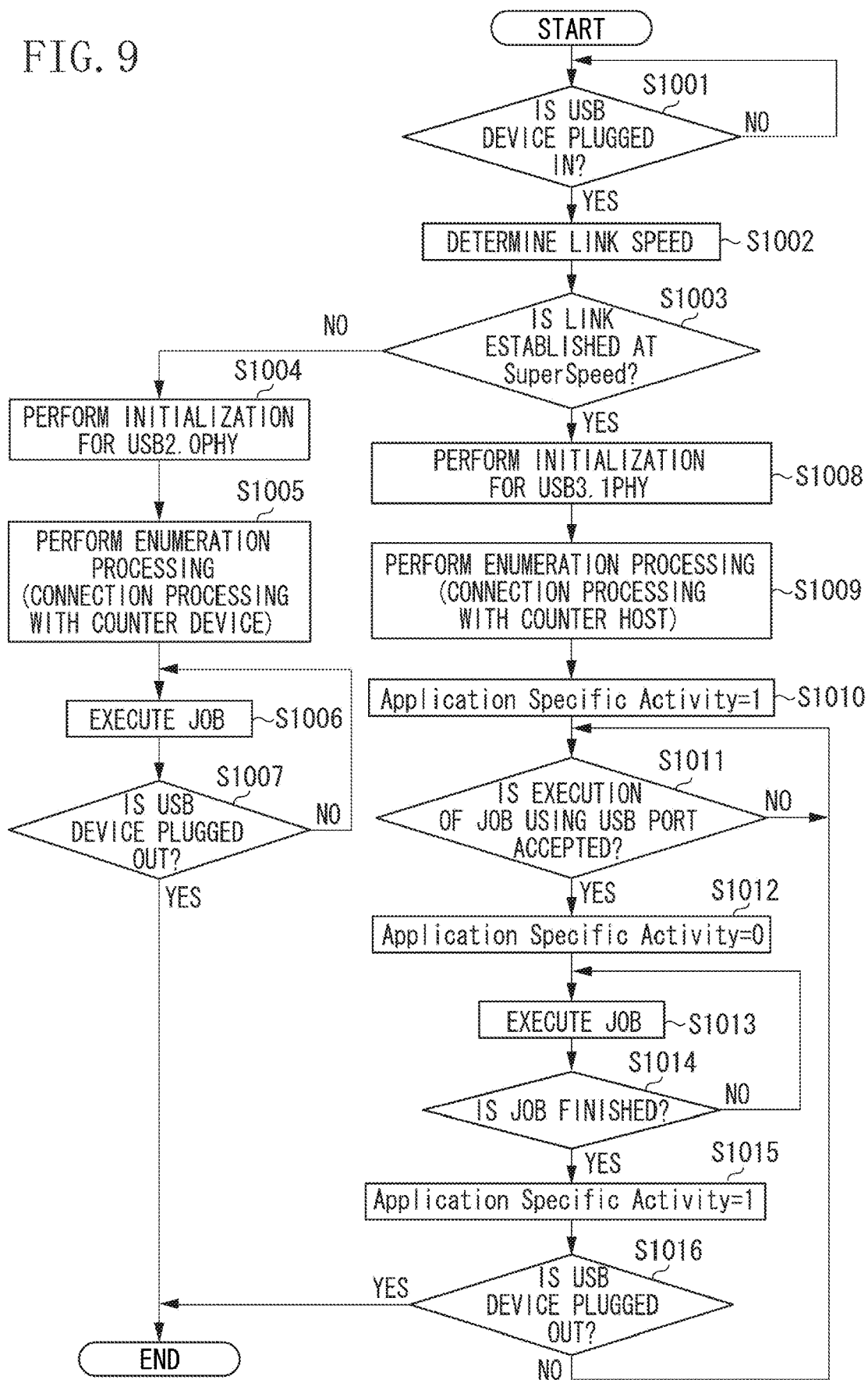
FIG. 9 is a flowchart illustrating an operation for performing an application specific activity (ASA) setting according to one embodiment.

FIG. 9 is a flowchart illustrating an operation for performing the ASA setting. The flowchart is executed by the CPU 304.

In step S1001, the CPU 304 of the image forming apparatus 100 according to the first exemplary embodiment determines whether the USB cable 105 is connected to a USB port 330. In step S1002, a controller to be connected is selected and a determination as to a link speed is made based on the receiver detection operation of a connection counterpart. In step S1003, the CPU 304 determines whether a link is established at SuperSpeed. If it is determined that a link is established at SuperSpeed (YES in step S1003), the processing proceeds to step S1008 to perform initialization for USB3.1 controller 325 and the PHY 327. If it is determined that a link is not established at SuperSpeed (NO in step S1003), the processing proceeds to step S1004 to perform initialization for the USB2.0 controller 326 and the USB2.0 PHY 328.

After step S1004, in step S1005, the CPU 304 executes enumeration processing. In the enumeration processing, the PC 106 and the USB2.0 controller 326 exchange predetermined data. Specifically, the USB2.0 controller 326 holds device information (address information about a communication counterpart, an attribute of a device, and setting information about a device), which is called a descriptor, and transmits the descriptor to the PC 106. The PC 106 analyzes descriptor data transmitted from the USB2.0 controller 326 to comprehend the configuration of the USB controller 311. In step S1006, the CPU 304 accepts an instruction to execute a job and executes the job until the USB cable 105 is plugged out.

After step S1008, in step S1009, the USB3.1 controller 325 executes enumeration processing for starting the communication connection at SuperSpeed. This enumeration processing is similar to the enumeration processing described above, and thus the description thereof is omitted. In the first exemplary embodiment, in step S1010, the CPU 304 controls the control register 333 to perform a setting (ASA setting=1) for permitting the transition to the power-saving state.

Next, in step S1011, the CPU 304 determines whether a job using the USB controller 311 is accepted. The job using the USB controller 311 includes at least one of a print job based on a print instruction from the PC 106 and a scan job for transmitting, to the PC 106, data on the image read by the reading unit 101 of the image forming apparatus 100.

In step S1011, if it is determined that the job using the USB controller 311 is accepted (YES in step S1011), the processing proceeds to step S1012 and the CPU 304 controls the control register 333 to perform a setting (ASA setting=0) for refusing the transition to the power-saving state. After the transition refusal setting, in step S1013, the job is executed. Thus, data (including scan data and print data) is transmitted between the PC 106 and the image forming apparatus 100 until the execution of the job is completed. In step S1014, the CPU 304 determines whether the job is finished. If it is determined that the job is finished (YES in step S1014), the processing proceeds to step S1015 to perform the setting (ASA setting=1) for permitting the transition to the power-saving state.

Next, in step S1016, it is determined whether the USB cable 105 is plugged out. If the USB cable 105 is plugged out (YES in step S1016), the processing of the flowchart ends.

Thus, in the first exemplary embodiment, the setting (ASA setting=0) for refusing the transition to the power-saving state is performed based on the acceptance of a job. This configuration makes it possible to prohibit the USB3.1 controller 325 from shifting to the low-power state during the transmission of data associated with the execution of a job between the image forming apparatus 100 and the PC 106. Accordingly, the USB3.1 controller 325 does not execute the training sequence during data transmission (the TS1 signal is not output), which prevents an occurrence of EMI resulting from the training sequence.

A second exemplary embodiment will now be described. In the first exemplary embodiment, the setting (ASA setting=0) for refusing the transition to the power-saving state is performed based on the acceptance of a job. In the second exemplary embodiment, the setting (ASA setting=0) for refusing the transition to the power-saving state is performed based on the transition of the image forming apparatus 100 to a standby mode.

Figure 10:
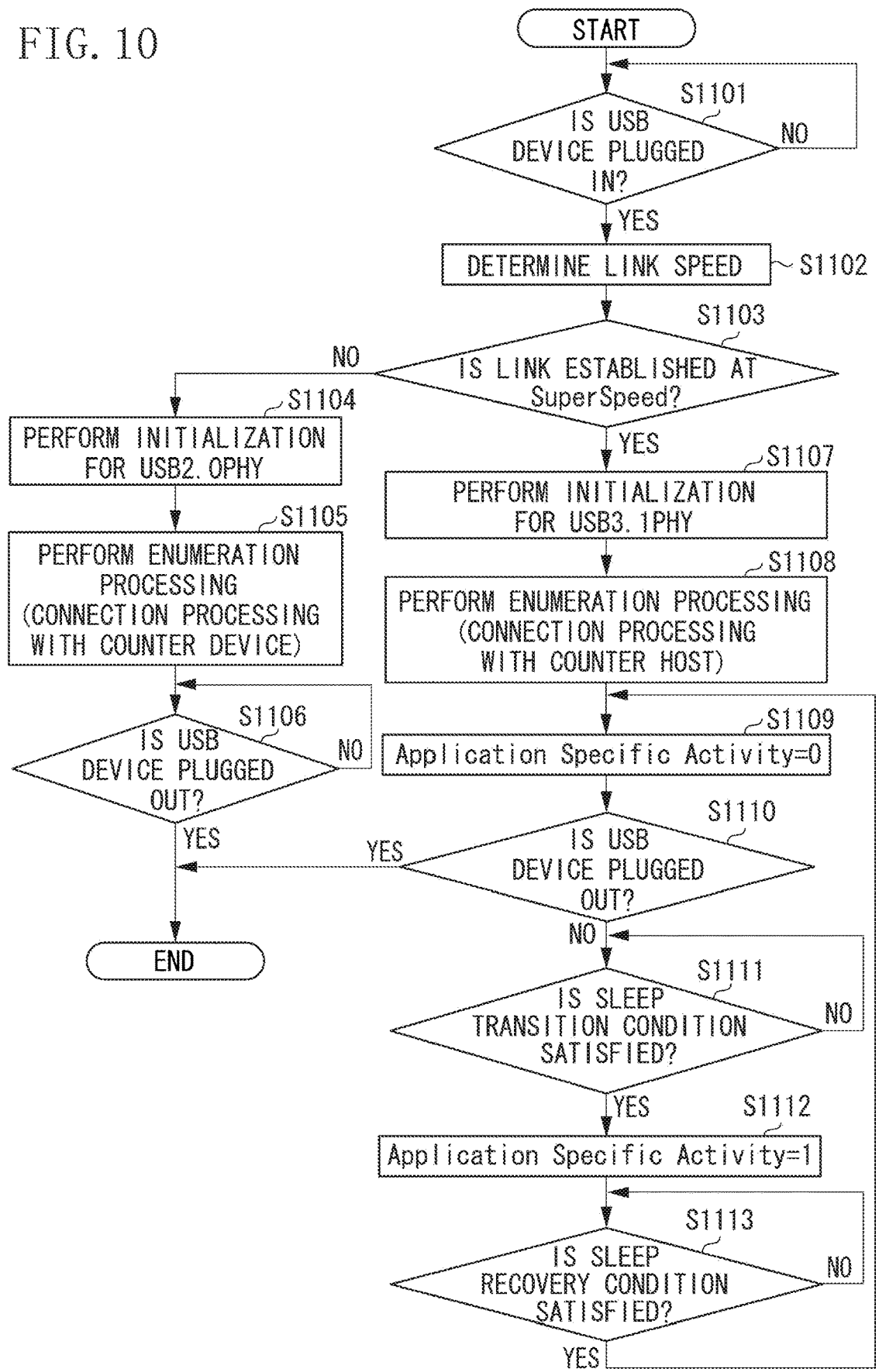
FIG. 10 is a flowchart illustrating an operation for a central processing unit (CPU) of an image forming apparatus according to a second exemplary embodiment to perform an ASA setting.

FIG. 10 is a flowchart illustrating an operation in which the CPU 304 of the image forming apparatus 100 according to the second exemplary embodiment performs the ASA setting.

The image forming apparatus 100 according to the second exemplary embodiment has a standby mode and a sleep mode in which power consumption is lower than that in the standby mode. The configuration of the image forming apparatus 100 according to the second exemplary embodiment is similar to that of the image forming apparatus 100 according to the first exemplary embodiment, and thus the description thereof is omitted. If there is no user input or no data input from an external apparatus for a predetermined period of time in the standby mode, the image forming apparatus 100 according to the second exemplary embodiment shifts to the sleep mode. Also, when a power-saving button (not illustrated) is pressed by the user, the image forming apparatus 100 shifts to the sleep mode from the standby mode.

In the second exemplary embodiment, in the standby mode, the setting (ASA setting=0) for refusing the transition to the power-saving state is performed, and in the sleep mode, the setting (ASA setting=1) for permitting the transition to the power-saving state is performed.

Steps S1101 to S1108 are similar to those of the first exemplary embodiment, and thus the descriptions thereof are omitted. When the enumeration processing is executed, in step S1109, the CPU 304 performs the refusal setting (ASA setting=0) as the setting for the transition to the power-saving state. After that, in step S1111, if the image forming apparatus 100 satisfies a condition for shifting to the sleep mode (YES in step S1111), the processing proceeds to step S1112 and the CPU 304 performs the permission setting (ASA setting=1) as the transition setting. In step S1113, if the image forming apparatus 100 satisfies a condition for recovery to the standby mode, the processing proceeds to step S1109 to perform the refusal setting (ASA setting=0) as the transition setting.

The image forming apparatus 100 according to the second exemplary embodiment executes a job during the standby mode. Accordingly, the setting for refusing the transition to the power-saving state is performed during the standby mode as described above in the second exemplary embodiment, thereby preventing the training sequence from being executed during the standby mode. Consequently, the USB controller 311 does not execute the training sequence (the TS1 signal is not output) during the standby mode, which prevents an occurrence of EMI resulting from the training sequence.

OTHER EXEMPLARY EMBODIMENTS

While in the exemplary embodiments described above, an example has been described where features of the present disclosure are applied to an image forming apparatus, in other embodiments, features of the present disclosure can also be applied to an information processing apparatus such as a personal computer.

The controller according to the exemplary embodiment of the present disclosure is not limited to a controller conforming to the USB standard, but instead may be a controller conforming to a serial communication standard, such as a controller conforming to the PCI standard or a controller conforming to the Institute of Electrical and Electronic Engineers (IEEE) 1394 standard.

Objects to be attained by the present disclosure can also be implemented by a configuration in which a recording medium recording a program code of software for implementing the functions of the exemplary embodiments described above is supplied to a system or apparatus. In this case, the functions described above are implemented by causing a computer (or a CPU or a micro processing unit (MPU)) of the system or apparatus to read out the program code stored in the recording medium and execute the program code. In this case, the recording medium storing the program code constitutes the present invention.

As the recording medium for supplying the program code, for example, a flexible disk, a hard disk, an optical disk, a magneto-optical disk, a compact disk read only memory (CD-ROM), a CD-recordable (CD-R), a magnetic tape, a nonvolatile memory card, or a ROM can be used.

The present disclosure is not limited to the configuration in which the functions of the exemplary embodiments described above are implemented by executing the program code read out by a computer. For example, the functions of the exemplary embodiments described above may also be implemented by processing in which an operating system (OS) or the like running on a computer performs a part or the whole of the actual processing based on an instruction from the program code.

Furthermore, the functions of the exemplary embodiments described above may also be implemented after the program code read out from the recording medium is written into a memory included in a function expansion board inserted in a computer or a function expansion unit connected to the computer. In other words, the functions of the exemplary embodiments described above may also be implemented by processing in which the program code is written into a memory and a CPU or the like included in the function expansion board or the function expansion unit executes a part or the whole of the actual processing based on an instruction from the program code.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MID), or Blu-ray Disc (BD)™), a flash memory device, a memory card, and the like.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-185428, filed Sep. 26, 2017, which is hereby incorporated by reference herein in its entirety.

What is claimed is:

1. An information processing apparatus comprising:
   a universal serial bus (USB) controller configured to transmit image data to an external apparatus via a USB bus, and able to shift to a low-power state based on a predetermined condition being met, wherein the USB controller transmits data of a predetermined pattern via the USB bus and receives data of a predetermined pattern via the USB bus when the USB controller recovers from the low-power state; and a controller including a processor and a memory, configured to set a setting value to the USB controller based on receiving a scan job using the USB controller, the setting value indicating that shifting to the low-power state is prohibited, cause the USB controller to transmit image data obtained by executing the scan job to the external apparatus via the USB bus, and cancel setting of the setting value to the USB controller based on completion of the scan job, wherein the USB controller is a USB device controller for the information processing apparatus functioning as a USB device, wherein the USB device controller is able to receive, from the external apparatus, a transition request for requesting a transition to the low-power state, and is able to transmit one of a transition refusal or a transition permission to the external apparatus as a response to the transition request, and wherein the USB device controller transmits the transition refusal in response to the transition request when the shifting to the low-power state is prohibited.

2. The information processing apparatus according to claim 1, wherein the USB controller performs control according to one of a USB3.0 standard or a USB3.1 standard.

3. The information processing apparatus according to claim 1, further comprising another USB controller configured to communicate with the external apparatus at a communication speed lower than a communication speed of the USB controller.

4. The information processing apparatus according to claim 3, wherein one of the USB controller or the other USB controller is selected for communication with the external apparatus, based on device information acquired from the external apparatus.

5. The information processing apparatus according to claim 1, further comprising a printing unit configured to print an image.

6. The information processing apparatus according to claim 1, further comprising a reading unit configured to read an image formed on a document.

7. A control method for an information processing apparatus including a universal serial bus (USB) controller, the USB controller able to shift to a low-power state based on a predetermined condition being met, and the USB controller being configured to transmit image data of a predetermined pattern via a USB bus and receive image data of a predetermined pattern via the USB bus when the USB controller recovers from the low-power state, the control method comprising:

transmitting the image data of the predetermined pattern to the external apparatus via the USB bus;

setting a setting value to the USB controller based on receiving a scan job using the USB controller, the setting value indicating that shifting to the low-power state is prohibited;

causing the USB controller to transmit image data obtained by executing the scan job to the external apparatus via the USB bus;

canceling setting of the setting value to the USB controller based on completion of the scan job, wherein the USB controller is a USB device controller for the information processing apparatus functioning as a USB device;

receiving, from the external apparatus, a transition request for requesting a transition to the low-power state, wherein the information processing apparatus is able to transmit one of a transition refusal or a transition permission to the external apparatus as a response to the transition request; and transmitting the transition refusal in response to the received transition request according to the shifting to the low-power state being prohibited.

8. The control method for the information processing apparatus according to claim 7, wherein the USB controller performs control according to one of a USB3.0 standard or a USB3.1 standard.

* * * * *